Nov. 17, 1931. J. S. GREENE ET AL 1,832,296
PHOTOGRAPHIC PRINT TREATING APPARATUS
Filed Dec. 19, 1928 6 Sheets-Sheet 1

INVENTORS
John S. Greene
BY Paul Landrock
Cumpton + Griffith
their ATTORNEYS Patented Nov. 17, 1931

1,832,296

UNITED STATES PATENT OFFICE

JOHN S. GREENE AND PAUL LANDROCK, OF ROCHESTER, NEW YORK, ASSIGNORS TO PHOTOSTAT CORPORATION, OF PROVIDENCE, RHODE ISLAND, A CORPORATION OF RHODE ISLAND

PHOTOGRAPHIC PRINT TREATING APPARATUS

Application filed December 19, 1928. Serial No. 326,957.

Our present invention relates to photography and more particularly to apparatus for exposing, feeding, cutting and conveying photographic prints through the various baths or liquid treatments necessary to complete them, and the invention has for its object to provide a simple easy running and efficient machine of this character which will also handle the prints rapidly and without injury. The improvements are directed in part to the means whereby the prints are separately and successively picked up by the carrying means; to the construction and arrangement of the successive tanks or baths; to the means for delivering the film in the final bath, and to means for agitating the liquid in the latter to submerge and thoroughly treat the exposed surface of the print.

To these and other ends the invention resides in certain improvements and combinations of parts, all as will be hereinafter more fully described, the novel features being pointed out in the claims at the end of this specification.

In the drawings:

Fig. 1 is a longitudinal vertical sectional view, partly broken away, through a print treating apparatus constructed in accordance with and illustrating one embodiment of our invention, the section being taken close to the inside face of a side wall of the casing;

Similar reference numerals throughout the several views indicate the same parts.

Our improvements are particularly applicable to and useful in connection with the well known commercial or copying type of camera in which sensitized paper is drawn from a roll into the focal plane, exposed, cut into separate sheets, conveyed through the various baths and finally deposited in the last tank or liquid holding receptacle from which it is withdrawn and dried as a finished article. We have shown in the drawings the principal arrangements of such a machine.

Referring more particularly to the drawings and to Fig. 1 thereof, we will first describe the general arrangement and major elements of the machine and then go into detail description of the various parts. The fragment of the camera body or exposing apparatus is indicated at 1 having at the bottom thereof feed rollers 2 which draw an exposed section of film constituting a print P downwardly from the focal plane support 3. It is severed by knives 4 arranged below the rollers and thence passes through an opening 5 in the bottom wall 6 into a chute 7 attached to said bottom wall and located within the general casing 8 of the developing and treating part of the apparatus. From this chute 7 the print is picked up by an endless conveyor composed of a pair of side chains 9 and carried through a developing tank 10, a washing tank 11, both at the bottom of the casing, and thence upwardly and forwardly again over a final hypo tank or tray 12 in which it is deposited and treated in a manner hereinafter more fully described.

The pick-up chute

Figure 2:
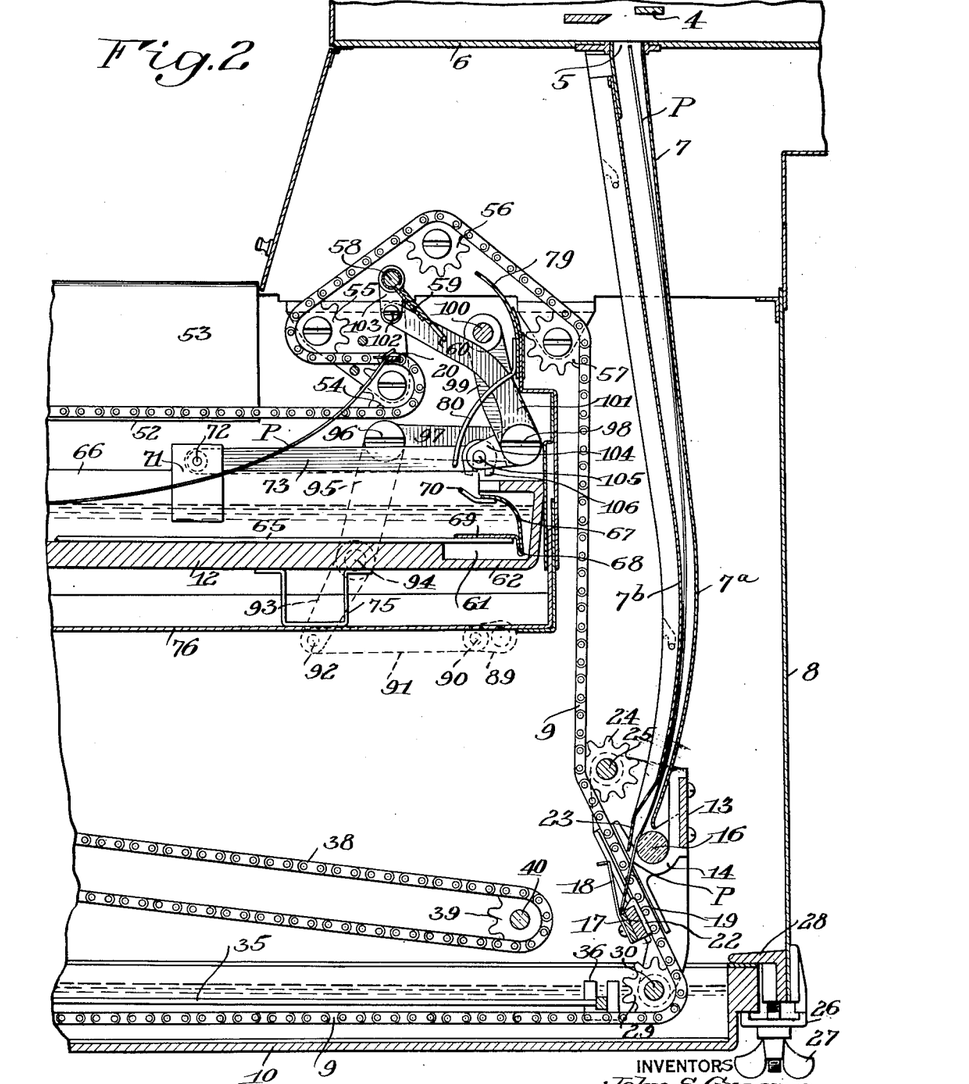
Fig. 2 is an enlarged view in greater detail showing the forward end of the apparatus as it appears in Fig. 1.
Figure 3:
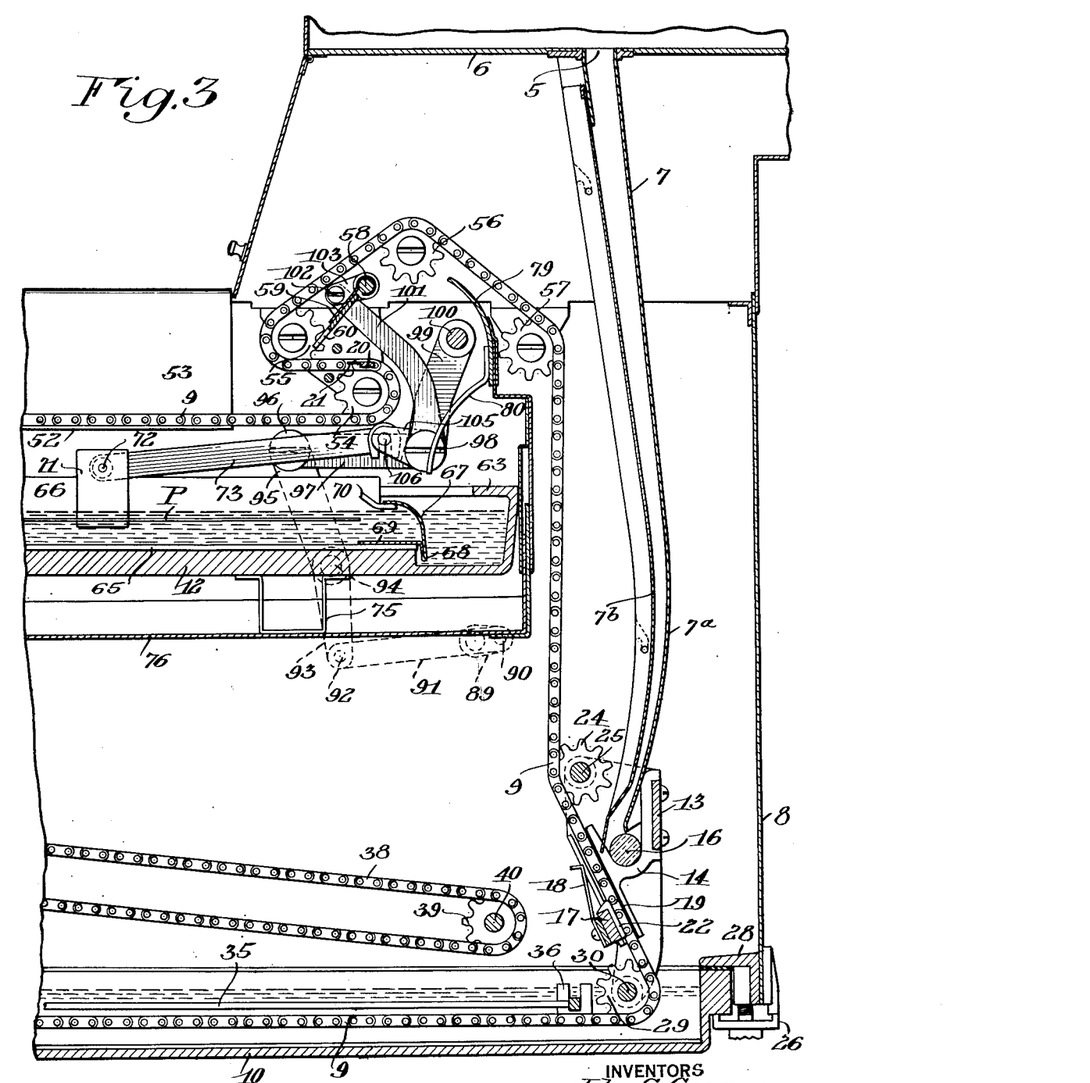
Fig. 3 is a view similar to Fig. 2 with the parts in other positions in the cycle of operation.

The chute 7 in which the severed print P is deposited is of the shape clearly shown in Fig. 2, for instance, embodying downwardly converging curved front and rear walls 7a and 7b. At its lower end is a transverse beam 13 connecting brackets 14 at each side by which the said lower end is supported. These brackets 14 in turn are suitably connected by angle brackets 15 to the side walls of the casing 8. At the mouth of the chute is arranged a transversely extending glass rod 16 supported in the brackets 14. The lower end of the front wall 7b is extended beyond the center of the glass rod and close thereto and below it is a transverse bar 17 having a plurality of upwardly extending stop fingers 18. The advancing edge of the print P slides over the surface of the glass rod 16 and lodges in the angle between the bar 17 and the stop fingers 18 as clearly shown in Fig. 2.

Figure 8:
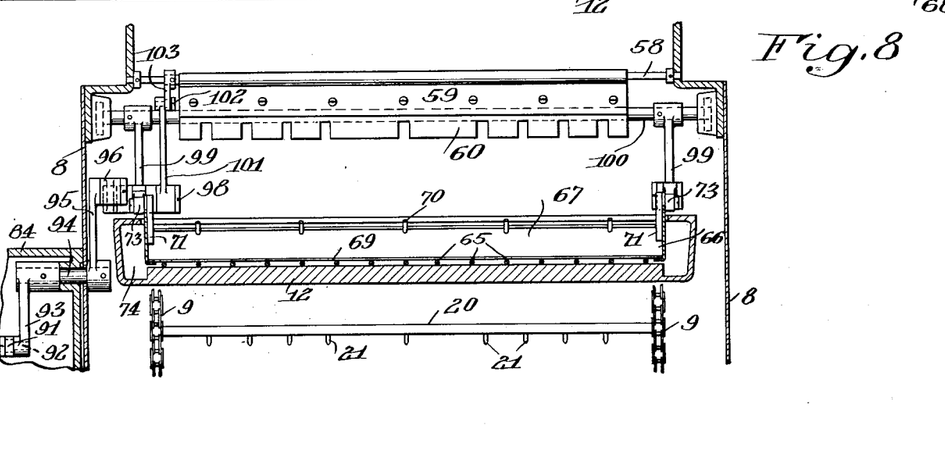
Fig. 8 is a fragmentary transverse section through the machine at the forward end of the hypo tank showing the print delivering mechanism and the print conveyor and one of the print holders or carrying bars thereof.

Each bracket 14 adjacent to the end of the bar 17 is provided with a chain guiding groove 19 for the side chains 9 of the conveyor. These chains are connected at intervals by print holding and carrying elements 20 in the present form of rigid pin bars each having a plurality of impaling pins 21 on the forward or advancing side thereof (Fig. 8). As these pin bars 20 pass through the chain guides 19 at the mouth of the chute 7 they engage and impale the edge of the print as supported by the bar 17 drawing it down over the glass rod 16 and starting it on its journey. To facilitate its easy passage the forward or inner side of the bar 17 is provided with grooves forming ribs 22 that contact with the edge of the print only at intervals. The fixed path of the chains and the pin bar past the supporting bar 17 is so close to the latter that the effective piercing engagement of the pins is inevitable.

The function of the glass rod 16 is not only to provide a smooth sliding surface for the print, but to present a dry surface that will not streak the print inasmuch as the sensitized or emulsion side is on the side of said bar. If, through condensation of evaporation of the various liquids confined in the casing 8 or from any other causes, a liquid deposit collects on the bar 16 it will gravitate to the lowest point of its circumference and drain into the tank 10. The aforesaid extension of the front wall 7b of the chute as indicated at 23 protects the bar 16 and the print from splashings or drainage due to the fact that the descending chains 9 of the carrier and the pin bars connecting them have been immersed in various liquids during their travel as will be hereinafter more particularly described. As the chains approach the pick-up point they travel down vertically as shown in Fig. 2, but sprockets 24 on a shaft 25 arranged near the mouth of the chute 7 direct them thence forwardly and more nearly transversely to the surface of the print as it emerges from the chute, which not only gives a better impaling engagement of the pin bars but causes drainage from the greater vertical stretch of the chain conveyor to drop directly into the tank 10 below.

The developing tank

The tank or receptacle 10 contains the developing fluid at about the level indicated in dotted lines, the tank being relatively shallow and secured detachably in position for removal downwardly by clips 26 and thumb screws 27 on frame pieces 28 of the casing 8. Partially submerged in this tank or tray are sprockets 29 on a transverse shaft 30 supported by the bracket 14 and the chain conveyor in passing over these becomes submerged as does the print that it is dragging along with it and travels rearwardly next to the bottom of the pan and thence around and upwardly from similarly spaced sprockets 31 at the rear end of the pan. These last mentioned sprockets are supported by a shaft depending into the pan in brackets 32. Said shaft, indicating at 33, is provided with a roller shell 34 for contact with the print as are other similar shafts hereinafter referrer to which will not again be described in detail.

In following its submerged course through the developing tank, the carrier 9 travels beneath a demountable wire grid 35 arranged at or below the surface level and which keeps the prints down in the liquid and prevents them from floating to the surface where the action of the developing fluid thereon would be imperfect. This grid in the present instance is supported at its ends in slotted brackets 36 on the sides of the pan as shown in Fig. 2.

Upon emerging from the developing pan the print conveyor 9 next passes around a jack shaft 37 driven by a sprocket chain 38 from a sprocket 39 on the main driving shaft 40 of the machine which will be later explained in detail. Cooperating with the roller shell 34 of this shaft is a gravity operated squeegee roller 38ª having journals 39ª slidable in inclined bearing slots 40ª in a bracket 41. As the pin bars 20 pass through these rolls they displace the squeegee roller 38ª which immediately drops back to engage the print and wring excess developing fluid therefrom before passage into a washing tank 11.

Certain features above described but not claimed in this application are claimed in the copending application of John S. Greene and Paul Landrock, for photographic print treating apparatus, Serial No. 352,354, filed April 4, 1929.

The washing tank 11 is similarly mounted for removal and replacement through the bottom of the apparatus by means of clips 26 and thumb screws 27 on the frame pieces 28 and is of substantial depth. The conveyor first passes over a guide sprocket 42 on a shaft 43 and then down through the washing tank over rolls 44, 45, and 46 alternated with partition walls 47 and 48. It may be said at this point that, as hereinafter described in detail, the travel of the endless chain conveyor 9 is intermittent. Three of the pin bars 20 are used in the present instance and the cycle of movement is such that one pin bar with its print is halted for treatment of the latter in the developing tank 10 while a second pin bar with its print is halted in the washing tank 11 and the third pin bar is discharging its print into the final hypo tank 12. The washing tank 11 not only washes the print free from developing fluid, but washes the chains 9 of the conveyor as well.

The washing tank 11 is maintained free of contamination from developing fluid and hypo drainage as hereinafter explained by maintaining therein a constant flow of fresh water which is introduced through an intake pipe connection 49 near the bottom and discharged through an overflow pipe connection 50 at the surface level.

*Hypo treatment and print stripper*

Figure 6:
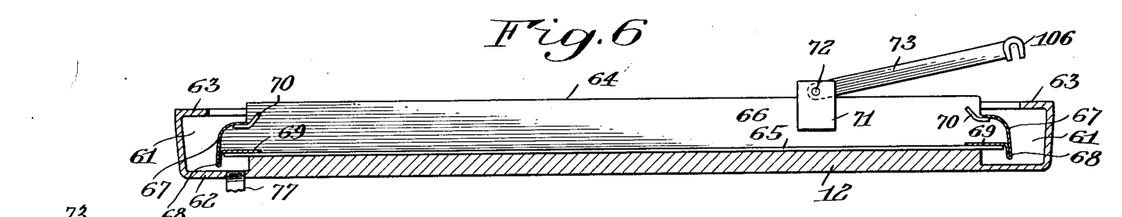
Fig. 6 is a longitudinal section through this tray.
Figure 7:
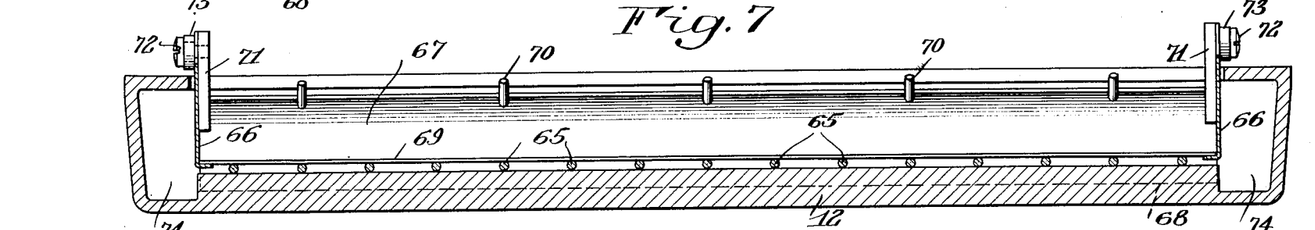
Fig. 7 is an enlarged transverse section through the same tray looking toward the forward end thereof.

The conveyor 9 and its attached prints traveling upwardly out of the washing tank 11 next passes over a guide sprocket 51 and forwardly horizontally on suitable supporting tracks 52 over the hypo receptacle or tray 12. The said tracks 52 are formed by flanges on bracket plates 53 secured to the sides of the frame. As the pin bars 20 pass along this forward stretch they trail the print through the hypo. The further progress of the chains is around guide sprockets 54, 55, 56 and 57 mounted on studs of the sides of the casing and thence finally downwardly to the point at which we have described this as picking up a fresh print from the chute 7. During this course it will be seen (see Fig. 2) that the direction of the chains and of the pin bars is temporarily reversed between sprockets 54 and 55, so that the impaling pins 21 are pointing rearwardly. This is during one of the periodic rests of the conveyor or print carrier. Just above the sprocket 54 is a transverse rock shaft 58 from which depends a swinging wiper or print stripper 59 preferably composed of a plate (Fig. 8) having secured thereto a serrated rubber strip 60 constituting a plurality of wiping fingers alternated with the pins 21 of the pin bars 20. This stripper vibrates continuously through driving connections hereinafter described and during one of its rearward swings while the pin bar 20 is at rest below it wipes the impaled edge of the print P from the pins 21 and deposits it in the hypo tank 12. The manner in which the print so deposited is treated in this hypo bath is an important feature of our invention and the preferred construction of this part of the mechanism is as follows:

The tray 12 is preferably of hard rubber or other chemically inert material, and is shown in detail in Figs. 6 and 7. At its two ends are pocket spaces 61 formed by depressions 62 in the thick bottom adjacent to the end walls in conjunction with overhanging ledges 63 at the tops of the end walls. A cage indicated generally at 64 and into which the stripped print falls reciprocates in the tray 12. It is composed in the present instance of grid like bottom wires 65 that rest and slide on the bottom of the tray with side walls 66 and end walls 67 connecting them. The end walls 67 have flange extensions projecting downwardly into the pockets 62 as indicated at 68 from whence an attaching flange 69 proceeds inwardly to take the attachment of the ends of the wires 65. The upper portions of the end walls 67 curve inwardly just below the flanges 63 on the adjacent end walls of the container 12 and are fitted, particularly at the forward end of the cage, with laterally spaced fingers 70 which prevent the ends of the prints from adhering thereto if deposited thereon. Near the forward end of the cage reenforcements 71 on its side walls carry pivoted thereto at 72 operating links 73 by means of which the cage is reciprocated in the tray sliding on its bottom, and the functioning of the parts is as follows:

Although the tray 12 is relatively shallow so that the total amount of hypo maintained therein need not be large, a considerable body of the liquid is collected in each of the pockets 61. As the cage slides toward the end wall of that particular pocket this body of fluid is trapped and compressed. At the same time the inwardly curved upper portion of the end wall 67 of the cage is passing beneath and closely adjacent to the ledge 63. The result is that the cage wall 67 and its depending extension 68 acts as a pump which causes the trapped liquid to squirt out toward the center of the cage and pan between these two elements and to thoroughly wet down and submerge the deposited print in the body of hypo. This agitation at the same time sets up generally a circulation in the hypo by creating waves that flow from end to end and treat underlying previously deposited prints as well as the last one to enter. This circulation is enhanced by a continuation of the end pocket depressions 62 in the bottom of the tray 12 down the sides of the latter as indicated at 74 in Fig. 7. Through these channels 74 as well as the suction created behind the flange extension 68 the refilling of the pockets 61 is quickly effected in preparation for the succeeding pumping movement of the end walls of the cage. It may be noted here also that this suction effect of the element 67—68 causes a downward trend in the body of the liquid that sucks down the ends of the prints with a further submerging action.

With the foregoing squirting effect and general agitation some splashing of the hypo from the tank is, of course, apt to occur. For this reason we prefer to mount the tray 12 by means of leg supports 75 in a drip pan 76 suitably mounted in the casing 8 and from which the hypo tray is removable. A drain pipe connection 77 from the tray 12 extends downwardly through an opening 78 in the bottom of the drip pan 76 at one end and the said drip pan is sloped downwardly toward this end. The opening 78 is directly above the washing tank 11 and it will be seen that the drainage from the drip pan will therefore drop into the latter. This, however, is not objectionable inasmuch as the volume of the drainage is slight and the before described circulation of pure water is maintained in the water tank. At its forward end the drip pan wall is extended upwardly and rearwardly into a curved portion 79 which rises above the stripper 59 and prevents the latter from throwing hypo acquired from the saturated elements with which it corroborates out of the hypo enclosure. In connection therewith, there is also provided a plurality of spaced fingers 80 that extend downwardly and rearwardly toward the fingers 70 of the reciprocating cage and act to prevent the forward edge of the falling strip print from adhering to any surface in that vicinity that might impede its direct progress into the body of hypo solution.

Driving mechanism

Figure 4:
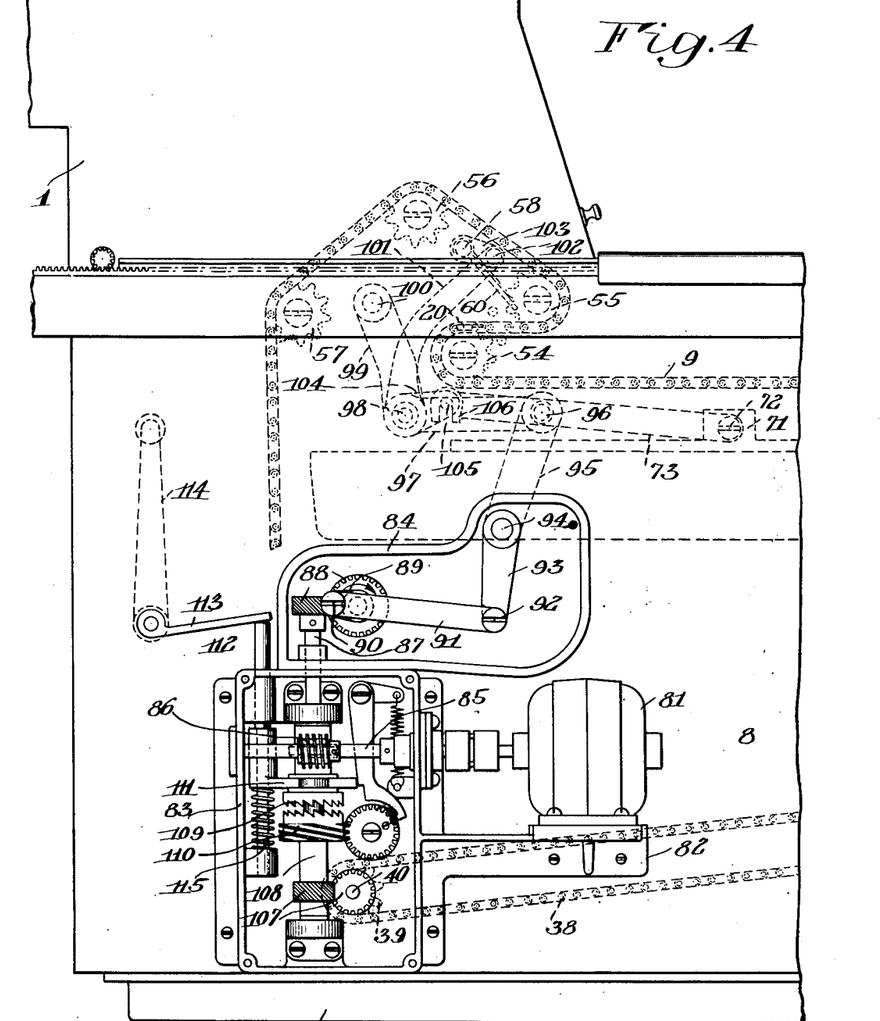
Fig. 4 is an enlarged fragmentary elevation of the forward portion of the machine viewed from the opposite side and showing the driving connection.
Figure 5:
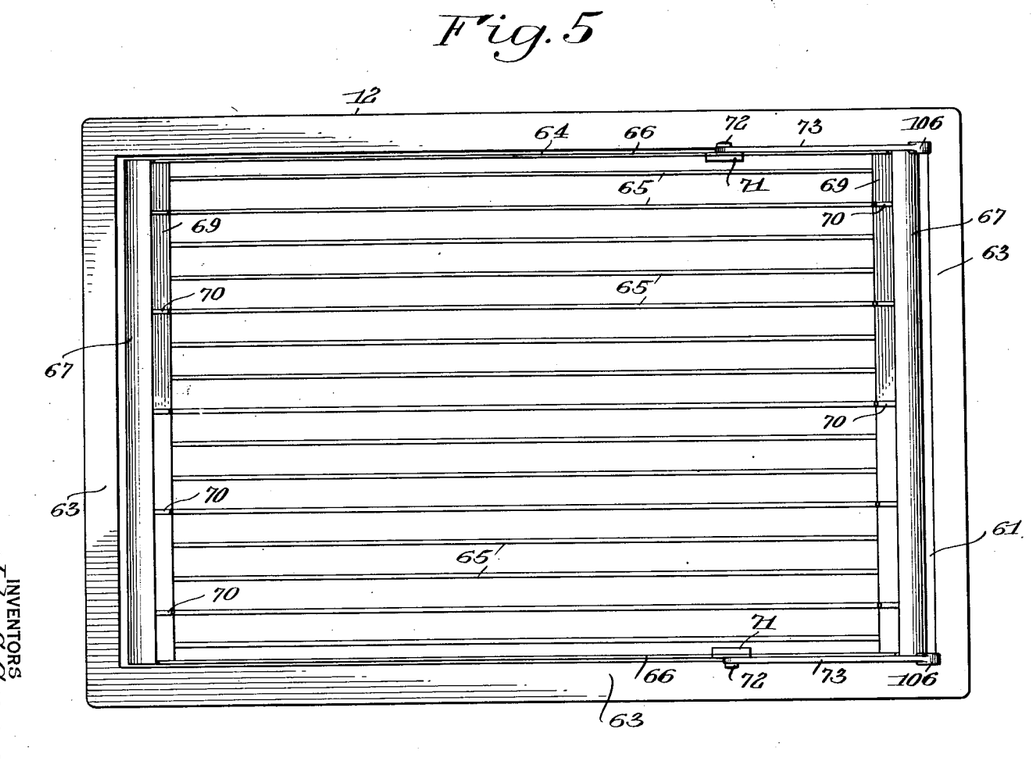
Fig. 5 is an enlarged top plan view of the hypo of final print receiving tank.

It has already been stated that the print conveyor 9 travels intermittently; that the stripper 59 vibrates continuously and that the print holding and agitating cage 64 reciprocates continuously. All of these motions are imparted to the respective parts from a common source of power as follows:

Referring to Fig. 4 a motor 81 on the left side of the machine is mounted on a bracket 82 on a gear case 83 having an upper extension piece 84. The gear case 83 contains a timing mechanism which it is not necessary to describe in detail herein inasmuch as it forms the subject matter of a separate patent application filed by one of our co-assignees. Suffice to say that the extension shaft 85 of the motor 81 through a worm 86 drives continuously a shaft 87 which through gearing 88 rotates a crank 89. A crank pin 90 thereon connects a pitman 91 through a wrist pin 92 to one arm of a lever 93 turning on a stud 94 in the gear case extension 84 (see also Fig. 8). Another arm of the lever 95 on the inside of the casing 8 is pivoted at 96 to a link 97. The other end of this link is pivoted at 98 to an arm 99 swinging on a fixed pivot 100. Fixed to the arm 99 is a curved arm 101 pivoted at 102 to a crank 103 on the shaft 58 of the stripper 59 which imparts a constant vibration to the latter. An extension 104 from the pivot 98 of the arm 99 carries a pin 105 with which is engaged a hook or fork 106 (Fig. 6) on the end of the link 73 of the reciprocatory cage 64 previously described. By this means the constant reciprocation of the cage is effected and the nature of the hook 106 permits it to be disengaged from its driving means when occasion is had to remove the cage 64 or the pan 12 or both, in which case the link 73, of course, accompanies the cage.

Still referring to Fig. 4, the drive shaft 40 for the conveyor 9 extends into the gear case 83 and through gearing 107 is turned by a sleeve shaft 108. The latter cooperates for driving purposes with the shaft 87 through clutch element 109 and 110. These are thrown into mesh at the will of the operator by means of a shipper 111 on a plunger 112 depressed by a dog 113 on a crank 114. The timing mechanism releases the shipper 111 at the end of a prescribed period of travel of the conveyor and allows a spring 115 to disconnect the clutch elements and bring the conveyor to a halt pending another impulse to the starter on the part of the operator.

While we have described the tanks or receptacles 10, 11, and 12 as respectively containing developing fluid, water, and hypo it is, of course, that these liquids can be interchanged, the invention being directed essentially to the mechanical movements and arrangement whereby the print is manipulated and treated without regard to the particular nature of the liquid treatment.

We claim as our invention:

1. The combination with a liquid treating receptacle for photographic prints, of means for conveying and depositing prints into said receptacle, a submerged reciprocatory print holding cage in the latter, and means for operating the print conveying means and for reciprocating the cage in predetermined timed relationship to each other.

2. The combination with a liquid treating receptacle for photographic prints, of means for conveying and depositing prints into said receptacle, a submerged reciprocatory print holding cage in the latter, and means for operating the print conveying means and for reciprocating the cage in timed relationship to each other, said means comprising a motor having connected gearing for driving the conveying means and a system of links and levers operatively connecting said motor to the reciprocating cage.

3. The combination with a liquid treating receptacle for photographic prints, of means for conveying and depositing prints into said receptacle, a submerged reciprocatory print holding cage in the latter, and means for operating the print conveying means and for reciprocating the cage in timed relationship to each other, said means comprising a motor having connected gearing for driving the conveying means and a system of links and levers operatively connecting said motor to the reciprocating cage, the latter system including a detachable direct connection with the cage to permit the cage to be independently detached and withdrawn from the receptacle.

4. In a photographic machine, the combination with an exposing apparatus having means for feeding and severing photographic prints from a continuous web and means for temporarily receiving the separate exposed prints, of a carrier having holding means adapted to pick up and convey prints from the receiving means, a liquid treating receptacle, means for transferring prints from the carrier to the said receptacle, a print holding cage in the latter, said cage comprising a substantially unperforated baffle member submerged in said receptacle, and means for reciprocating the cage to cause said baffle member to create a substantial wave motion in the receptacle affecting the said prints.

5. A liquid treating receptacle for photographic prints having combined therewith a reciprocatory submerged agitator adapted to create print submerging waves emanating alternately from opposite ends of the receptacle, a print conveyor, a device for transferring a print from the conveyor to the receptacle, and means for driving the conveyor, the print transferring device, and the agitator in timed relationship to each other.

6. A liquid treating receptacle for photographic prints having a reciprocatory print holding cage therein provided with walls at each end adapted to create oppositely flowing waves in conjunction with the respective adjacent end walls of the receptacle, the receptacle being provided with recesses affording a greater depth of liquid adjacent to said end walls for the formation of such waves.

7. A liquid treating receptacle for photographic prints having depressions adjacent to its end walls in combination with a reciprocatory print receiving and holding cage in the receptacle having end walls adapted to create waves in the receptacle in cooperation with the end walls of the latter and the adjacent depressions.

8. A liquid treating receptacle for photographic prints having depressions adjacent to its end walls in combination with a reciprocatory print receiving and holding cage in the receptacle having end walls adapted to create waves in the receptacle in cooperation with the end walls of the latter and the adjacent depressions, the end walls of the cage being provided with pumping flanges operating in the said depressions.

9. A liquid treating receptacle for photographic prints having depressions adjacent to its end walls in combination with a reciprocatory print receiving and holding cage in the receptacle having end walls adapted to create waves in the receptacle in cooperation with the end walls of the latter and the adjacent depressions, the end walls of the cage being provided with pumping flanges operating in the said depressions, and the end walls of the receptacle being provided with overhanging portions between which and the walls of the cage the liquid is squeezed and projected into the cage.

10. The combination of a liquid holding receptacle for photographic prints having pockets at its ends and a reciprocatory print holding cage therein provided with end portions complementary to the respective container end pockets so that the contained liquid is trapped between the respective adjacent ends of said elements and caused to squirt over the prints in the cage in opposite directions, alternately.

11. The combination of a liquid holding receptacle for photographic prints having pockets at its ends and a reciprocatory print holding cage therein provided with end portions complementary to the respective container end pockets so that the contained liquid is trapped between the respective adjacent ends of said elements and caused to squirt over the prints in the cage in opposite directions, alternately, the pockets of the container embodying bottom depressions and the end portions of the cage embodying pumping flanges operating in said pockets.

12. In a photographic apparatus, a liquid container for exposed prints, a fluid treating chamber containing the same and from which the container is removable, a reciprocatory agitator within the container, driving means, and a detachable connection between the agitator and said driving means, said connection comprising a hooked link on the agitator and a lever provided with a pin engaged by the hooked link.

13. In a photographic developing apparatus, the combination with a developing tank, a washing tank having means for causing a flow of fresh water therethrough, a hypo tank arranged above said first mentioned tanks and means for conveying a print through the several tanks, of a drip pan for the hypo tank arranged to drain into the washing tank.

JOHN S. GREENE.
PAUL LANDROCK.